US008767605B2

(12) United States Patent
Lin et al.

(10) Patent No.: US 8,767,605 B2
(45) Date of Patent: Jul. 1, 2014

(54) TRANSMIT POWER CONTROL INFORMATION AND POWER CONTROL METHOD, SYSTEM AND DEVICE

(75) Inventors: Yanan Lin, Beijing (CN); Zukang Shen, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 0 days.

(21) Appl. No.: 13/984,533

(22) PCT Filed: Feb. 22, 2012

(86) PCT No.: PCT/CN2012/071475
§ 371 (c)(1),
(2), (4) Date: Aug. 9, 2013

(87) PCT Pub. No.: WO2012/119513
PCT Pub. Date: Sep. 13, 2012

(65) Prior Publication Data
US 2013/0336272 A1    Dec. 19, 2013

(30) Foreign Application Priority Data

Mar. 4, 2011    (CN) .......................... 2011 1 0053098

(51) Int. Cl.
*G08C 17/00*    (2006.01)
*H04W 52/02*    (2009.01)
(52) U.S. Cl.
CPC ...... *H04W 52/0235* (2013.01); *H04W 52/0212* (2013.01); *H04W 52/0222* (2013.01)
USPC ............................ 370/311; 370/389; 455/522
(58) Field of Classification Search
None
See application file for complete search history.

(56) References Cited

U.S. PATENT DOCUMENTS

| 2011/0038271 | A1* | 2/2011 | Shin et al. ...................... 370/252 |
| 2011/0165906 | A1* | 7/2011 | Papasakellariou et al. ... 455/522 |
| 2012/0188974 | A1* | 7/2012 | Qiang et al. .................. 370/329 |
| 2012/0236799 | A1* | 9/2012 | Dai et al. ...................... 370/328 |

FOREIGN PATENT DOCUMENTS

| CN | 101695009 A | 4/2010 |
| CN | 101778462 A | 7/2010 |

(Continued)

OTHER PUBLICATIONS

International Search Report for PCT/CN2012/071475.

(Continued)

*Primary Examiner* — Yemane Mesfin
*Assistant Examiner* — Christine Duong
(74) *Attorney, Agent, or Firm* — Kilpatrick Townsend & Stockton LLP (57) ABSTRACT

An embodiment of the present invention relates to the technical field of wireless communication. Disclosed are a transmit power control and power control method, system and device for solving the problem of user equipment unable to control the power of a PDCCH when reusing a TPC command, thus decreasing the PDCCH power accuracy. The method in the embodiment of the present invention comprises: determining whether the TPC domain in a first DCI format information is a non-TPC command after a user equipment receiving the first DCI format information; when the TCP domain of the first DCI format information received by the user equipment is a non-TPC command, and after receiving a second DCI format information in the downlink subframe receiving the first DCI format information, using the TPC command in the second DCI format information to control the PUCCH power. Employing the method of the present invention can improve the PUCCH power accuracy and the performance of the user equipment.

14 Claims, 2 Drawing Sheets

(56) References Cited

FOREIGN PATENT DOCUMENTS

| CN | 101801097 A | 8/2010 |
|---|---|---|
| CN | 102111863 A | 6/2011 |
| WO | 2010146971 A1 | 12/2010 |

OTHER PUBLICATIONS

Written Opinion of the ISA.

* cited by examiner

TRANSMIT POWER CONTROL INFORMATION AND POWER CONTROL METHOD, SYSTEM AND DEVICE

This application is a US National Stage of International Application No. PCT/CN2012/071475, filed Feb. 22, 2012, designating the United States, and claiming the benefit of Chinese Patent Application No. 201110053098.3, filed with the Chinese Patent Office on Mar. 4, 2011 and entitled "Power control information sending and power control method, system and apparatus", both of which are hereby incorporated by reference in their entireties.

FIELD

The present invention relates to the technical field of wireless communications and particularly to a power control information sending and power control method, system and apparatus.

BACKGROUND

In a sub-frame i of a Long Term Evolution (LTE) system, transmit power $P_{PUCCH}$ of a User Equipment (UE) on a Physical Uplink Control Channel (PUCCH) is set and defined as follows:

$$P_{PUCCH}(i) = \min\{P_{CMAX}, P_{0\_PUCCH} + PL + h(n_{CQI}, n_{HARQ}) + \Delta_{F\_PUCCH}(F) + g(i)\} [\text{dBm}]$$

(Reference can be made to the protocol 3GPP TS 36.213 for details).

Where $$g(i) = g(i-1) + \sum_{m=0}^{M-1} \delta_{PUCCH}(i-k_m)$$

and g(i) represents a current adjustment value of PUCCH power control.

$\delta_{PUCCH}$ represents a revision value specific to the user equipment, that is, a Transmit Power Control (TPC) command, which is included in a Physical Downlink Control Channel (PDCCH) carrying the Downlink Control Information (DCI) formats 1A, 1B, 1D, 1, 2A, 2B, 2C and 2; or is encoded jointly with a PUCCH revision value specific to anther user equipment and sent in a PDCCH carrying the DCI formats 3 and 3A, and at this time, Cyclic Redundancy Check (CRC) parity bits are scrambled with a TPC-PUCCH-RNTI (Radio Network Temporary Identifier).

In all states except the Discontinuous Reception (DRX) state, the user equipment attempts to decode a PDCCH carrying the DCI formats 3 and 3A by the TPC-PUCCH-RNTI specific to the user equipment and decode one or more PDCCH carrying the DCI formats 1A, 1B, 1D, 1, 2A, 2B, 2C and 2 by a Cell Radio Network Temporary Identifier (C-RNTI) specific to the user equipment in each downlink sub-frame.

If the UE detects a PDCCH carrying the DCI formats 1A, 1B, 1D, 1, 2A, 2B, 2C and 2, that is, a detected RNTI is equal to the C-RNTI of the UE, then the UE will use $\delta_{PUCCH}$ provided in this PDCCH; otherwise, if the UE detects a PDCCH carrying the DCI formats 3 and 3A, then the UE will use $\delta_{PUCCH}$ provided in this PDCCH; otherwise, the UE sets $\delta_{PUCCH} = 0$ dB.

In an LTE-A system, an eNB will redefine a part of DCI bit information to indicate other information so as not to increase a PDCCH overhead, for example, when DAI≠1 in the DCI formats 1A, 1D, 1, 2A, 2B, 2C and 2, information in a TPC field in the DCI is used to indicate PUCCH resource indication information, and at this time a TPC command word in the DCI formats 1A, 1B, 1D, 1, 2A, 2B, 2C and 2 can not provide power control information.

In summary, the user equipment can not be provided with power control information so far when information in the TPC field is used to indicate a non-TPC command so that the user equipment can not perform PUCCH power control, thus degrading the accuracy of PUCCH power.

SUMMARY

Embodiments of the invention provide a power control information sending and power control method, system and apparatus so as to address such a problem in the prior art that a user equipment can not perform PUCCH power control when information in a TPC field is used to indicate a non-TPC command so that the accuracy of PUCCH power is degraded.

An embodiment of the invention provides a power control method including:

a user equipment determining whether information in a Transmit Power Control, TPC, field in first Downlink Control Information, DCI, format is a non-TPC command after receiving the first DCI format; and the user equipment performing Physical Uplink Control Channel, PUCCH, power control with a TPC command in second DCI format when the information in the TPC field in the first DCI format is a non-TPC command and the user equipment receives the second DCI format in a downlink sub-frame in which the first DCI format is received.

An embodiment of the invention provides a method of sending power control information, including:

a network side determining whether a non-Transmit Power Control, TPC, command is configured in a TPC field in first Downlink Control Information, DCI, format;

when a non-TPC command is configured in the TPC field in the first DCI format, the network side setting the non-TPC command in the TPC field in the first DCI format; and the network side sending the first DCI format and/or second DCI format in a downlink sub-frame, wherein a TPC command in the second DCI format is information of Physical Uplink Control Channel, PUCCH, power.

An embodiment of the invention provides a power control apparatus including:

a first determining module configured to determine whether information in a Transmit Power Control, TPC, field in first Downlink Control Information, DCI, format is a non-TPC command after receiving the first DCI format; and a power control module configured to perform Physical Uplink Control Channel, PUCCH, power control with a TPC command in second DCI format when the information in the TPC field in the first DCI format is a non-TPC command and the user equipment receives the second DCI format in a downlink sub-frame in which the first DCI format is received.

An apparatus for sending power control information, including:

a second determining module configured to determine whether a non-Transmit Power Control, TPC, command is configured in a TPC field in first Downlink Control Information, DCI, format;

a setting module configured, when a non-TPC command is configured in the TPC field in the first DCI format, to set the non-TPC command in the TPC field in the first DCI format; and a sending module configured to send the first DCI format and/or second DCI format in a downlink sub-frame, wherein a TPC command in the second DCI format is information of Physical Uplink Control Channel, PUCCH, power.

An embodiment of the invention provides a power control system including:

a network-side apparatus configured to determine whether a non-Transmit Power Control, TPC, command is configured in a TPC field in first Downlink Control Information, DCI, format, and when a non-TPC command is configured in the TPC field in the first DCI format, to set the non-TPC command in the TPC field in the first DCI format, and to send the first DCI format and/or second DCI format in a downlink sub-frame, wherein a TPC command in the second DCI format is information of Physical Uplink Control Channel, PUCCH, power; and a user equipment configured to determine whether the information in the TPC field in the first DCI format is a non-TPC command after receiving the first DCI format, and to perform PUCCH power control with a TPC command in second DCI format when the information in the TPC field in the first DCI format is a non-TPC command and after receiving the second DCI format in a downlink sub-frame in which the first DCI format is received.

In the embodiments of the invention, a user equipment can determine power control information provided from the network side and perform PUCCH power control when information in a TPC field is used to indicate a non-TPC command to thereby improve the accuracy of PUCCH power and the performance of the user equipment.

DETAILED DESCRIPTION OF THE EMBODIMENTS

In embodiments of the invention, the network side sets information in a TPC field in first DCI format as a non-TPC command when information in the TPC field in the first DCI format is the non-TPC command; and a user equipment performs PUCCH power control with a TPC command in second DCI format after receiving the first DCI format with the information in the TPC field which is the non-TPC command and receiving the second DCI format in a downlink sub-frame in which the first DCI format is received. The user equipment can determine power control information provided from the network side and perform PUCCH power control when the information in the TPC field is used to indicate a non-TPC command to thereby improve the accuracy of PUCCH power and the performance of the user equipment.

Particularly the first DCI format according to the embodiments of the invention includes but will not be limited one of the following information:

The DCI format 1A, the DCI format 1B, the DCI format 1D, the DCI format 1, the DCI format 2A, the DCI format 2B, the DCI format 2C and the DCI format 2.

The second DCI format according to the embodiments of the invention includes but will not be limited one of the following information:

The DCI format 3A and the DCI format 3.

The following description will be given firstly of an implementation with cooperation of the network side and the user equipment side and finally of implementations respectively at the network side and the user equipment side, but this will not suggest that both sides must cooperate for an implementation, and indeed, problems existing respectively with the network side and the user equipment side can also be addressed when the network side and the user equipment side are implemented separately although a better technical effect can be achieved when they are used in cooperation.

Figure 1:
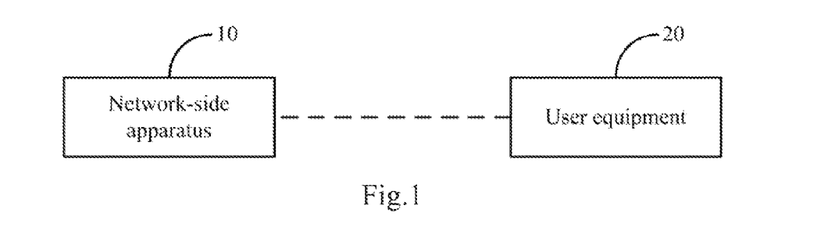
FIG. 1 is a schematic structural diagram of a power control system according to an embodiment of the invention.

As illustrated in FIG. 1, a power control system according to an embodiment of the invention includes a network-side apparatus 10 and a user equipment 20.

The network-side apparatus 10 is configured to determine whether a non-TPC command is configured in a TPC field in first DCI format, and when a non-TPC command is configured in the TPC field in the first DCI format, to set the non-TPC command (that is, a TPC command indicating other information) in the TPC field in the first DCI format, and to send the first DCI format and/or second DCI format in a downlink sub-frame, where a TPC command in the second DCI format is information of PUCCH nower.

The user equipment 20 is configured to determine whether information in the TPC field in the first DCI format is a non-TPC command after receiving the first DCI format from the network-side apparatus 10, and to perform PUCCH power control with a TPC command in second DCI format when the information in the TPC field in the first DCI format is a non-TPC command and after receiving the second DCI format in a downlink sub-frame in which the first DCI format is received.

Particularly when the information in the TPC field in the first DCI format is a non-TPC command, after setting the non-TPC command in the TPC field in the first DCI format, the network side apparatus 10 can send only the first DCI format with the information in the TPC field which is the non-TPC command; or can send only the second DCI format with the TPC command which is the information of the PUCCH power; or preferably can send in a downlink sub-frame the first DCI format with the information in the TPC field which is the non-TPC command and the second DCI format with the TPC command which is the information of the PUCCH power.

Of course, the network side apparatus 10 can further subsequently send the first DCI format with a TPC command which is information of PUCCH power.

Preferably when the information in the TPC field in the first DCI format is a TPC command, after setting the TPC command in the TPC field in the first DCI format, the network side apparatus 10 can send only the first DCI format with the information in the TPC field which is the TPC command; or can send only the second DCI format with the TPC command which is the information of the PUCCH power; or can send in a downlink sub-frame the first DCI format with the information in the TPC field which is the TPC command and the second DCI format with the TPC command which is the information of the PUCCH power.

When the format is sent in either of the foregoing alternatives, if the first DCI format is received, then the user equipment 20 determines whether the information in the Transmit Power Control (TPC) field in the first DCI format is a non-TPC command after receiving the first DCI format and performs PUCCH power control with the TPC command in second DCI format when the information in the TPC field in the first DCI format is a non-TPC command and after receiving the second DCI format in the downlink sub-frame in which the first DCI format is received.

After it is determined whether the information in the Transmit Power Control (TPC) field in the first DCI format is a non-TPC command, if the information in the TPC field in the first DCI format is determined to be a TPC command, then the user equipment 20 performs PUCCH power control with the TPC command in the first DCI format regardless of whether the second DCI format is received.

After it is determined whether the information in the Transmit Power Control (TPC) field in the first DCI format is a non-TPC command, if the information in the TPC field in the first DCI format is determined to be a non-TPC command and when no second DCI format is received in the downlink sub-frame in which the first DCI format is received, an adjustment value of PUCCH power is determined to be zero, and at this time the user equipment 20 can perform no PUCCH power control or can adjust according to zero.

If the user equipment 20 receives the second DCI format but no first DCI format in a downlink sub-frame in which the second DCI format is received, then it performs PUCCH power control with the TPC command in the second DCI format.

In order to avoid the user equipment 20 from making each determination, preferably a switch can be set, and the user equipment 20 will make determination only if the information in the TPC field in the first DCI format can be used to indicate a non-TPC command.

Specifically the network-side apparatus 10 can configure a PUCCH format to the user equipment in order to indicate to the user equipment whether the information in the TCP field in the first DCI format can be used to indicate a non-TPC command, for example, can notify the user equipment 20 that the information in the TPC field in the first DCI format can be used to indicate a non-TPC command after determining that the information in the TPC field in the first DCI format can be used to indicate a non-TPC command; and correspondingly the user equipment 20 determines whether the information in the TPC field in the first DCI format is a non-TPC command only after determining from the notification that the information in the TPC field in the first DCI format can be used to indicate a non-TPC command.

The network-side apparatus 10 can notify the user equipment 20 that the information in the TPC field in the first DCI format can or cannot be used to indicate a non-TPC command in numerous schemes, for example, by sending bit information, where "1" indicates "CAN", and "0" indicates "CAN NOT".

Preferably the network-side apparatus 10 can configure a PUCCH format to the user equipment 20 in order to indicate the user equipment 20 that the information in the TPC field in the first DCI format can be used to indicate a non-TPC command; and correspondingly the user equipment 20 can determine from the PUCCH format configured by the network-side apparatus 10 that the information in the TPC field in the first DCI format can be used to indicate a non-TPC command.

For example, the PUCCH format 3 and the PUCCH format 1b which is combined with channel selection correspond to that the information in the TPC field in the first DCI format can be used to indicate a non-TPC command, and the PUCCH format 1/1a/1b corresponds to that the information in the TPC field in the first DCI format can not be used to indicate a non-TPC command. The network-side apparatus 10 configures the user equipment 20 with the PUCCH format 3 or the PUCCH format 1b which is combined with channel selection, and then the information in the TPC field in the first DCI format can be used to indicate a non-TPC command; and the network apparatus 10 configures the user equipment 20 with the PUCCH format 1/1a/1b, and then the information in the TPC field in the first DCI format can not be used to indicate a non-TPC command; and correspondingly the user equipment 20 can know from the configured PUCCH format whether the information in the TPC field in the first DCI format can be used to indicate a non-TPC command.

In an implementation, the network-side apparatus 10 can notify the user equipment 20 whether the information in TPC field in the first DCI format is a non-TPC command in numerous schemes, for example, the network-side apparatus 10 sends a notification message to the user equipment 20 to notify the user equipment 20 whether the information in the TPC field in the first DCI format is a non-TPC command; and correspondingly the user equipment 20 knows from the received notification message whether the information in the TPC field in the first DCI format is a non-TPC command.

Preferably the network-side apparatus 10 sets whether the information in the TPC field in the first DCI format is a non-TPC command by a Downlink Assignment Index (DAI) in the first DCI format; and correspondingly the user equipment 20 determines from the Downlink Assignment Index (DAI) in the first DCI format whether the information in the TPC field in the first DCI format is a non-TPC command.

For example, a TPC field with a corresponding DAI of "1" is a TPC command, and a TPC field with a corresponding DAI of "2", "3" or "4" is a non-TPC command, and then the network-side apparatus 10 sets the TPC command in the TPC field in the first DCI format with the DAI of "1" and the non-TPC command in the TPC field in the first DCI format with the DAI of other than "1"; and correspondingly the user equipment 20 knows from the value of the DAI whether the information in the TPC field in the first DCI format is a non-TPC command.

An embodiment will be given below.

If it is specified in the system that information in a TPC field in the DCI format 1A/1B/1D/1/2A/2B/2C/2 with a DAI=1 is used to indicate information of PUCCH power control and information in a TPC field in the DCI format 1A/1B/1D/1/2A/2B/2C/2 with a DAI of another value is used to indicate a PUCCH resource, then:

If the user equipment 20 decodes a PDCCH carrying the DCI format 1A/1B/1D/1/2A/2B/2C/2 and detects an RNTI equal to a C-RNTI of the user equipment 20 and there is DAI=1, then the user equipment 20 will perform PUCCH power control with $\delta_{PUCCH}$ provided in this PDCCH;

Otherwise, if the user equipment 20 decodes a PDCCH carrying the DCI format 3/3A (including reception of only the DCI format 3/3A; or reception of both the DCI format 1A/1B/1D/1/2A/2B/2C/2 and the DCI format 3/3A in a sub-frame but DAI≠1 in the DCI format 1A/1B/1D/1/2A/2B/2C/2), then the user equipment 20 will perform PUCCH power control with $\delta_{PUCCH}$ provided in this PDCCH;

Otherwise, if there is DAI≠1 in the DCI format 1A/1B/1D/1/2A/2B/2C/2 and no DCI format 3/3A is received, then the user equipment 20 will set $\delta_{PUCCH}$=0 dB.

Particularly the network-side apparatus according to the embodiments of the invention can be an eNB (e.g., a macro eNB, a home eNB, etc.) or can be a Relay Node (RN) apparatus or can be another network-side apparatus.

Based upon the same inventive idea, embodiments of the invention further provide a network-side apparatus, a user equipment, a method of sending power control information and a power control method and since these apparatus and methods address the problem under a similar principle to that of the power control system, reference can be made to the implementation of the system for implementations of these apparatus and methods, and a repeated description thereof will be omitted here.

Figure 2:
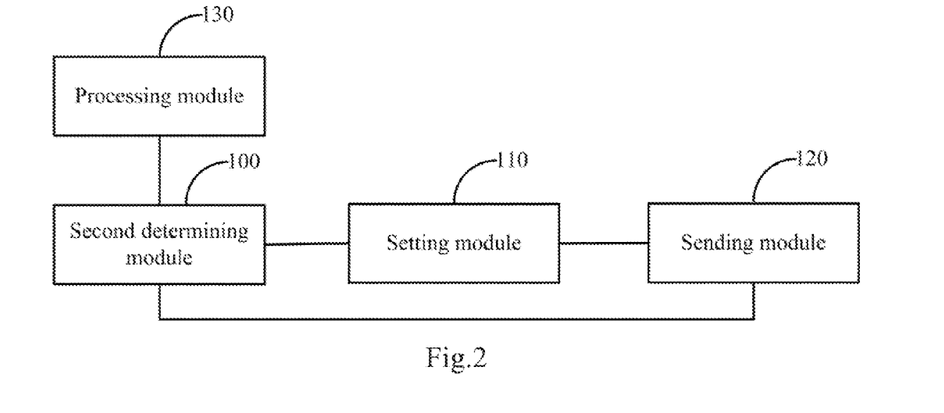
FIG. 2 is a schematic structural diagram of a network-side apparatus according to an embodiment of the invention.

As illustrated in FIG. 2, a network-side apparatus according to an embodiment of the invention includes a second determining module 100, a setting module 110 and a sending module 120.

The second determining module 100 is configured to determine whether a non-TPC command is configured in a TPC field in first DCI format.

When a non-TPC command is configured in the TPC field in the first DCI format, the setting module 110 is configured to set the non-TPC command in the TPC field in the first DCI format.

The sending module 120 is configured to send the first DCI format and/or second DCI format in a downlink sub-frame.

Particularly a TPC command in the second DCI format is information of PUCCH power.

Preferably when the information in the TPC field in the first DCI format is a TPC command, the setting module 110 sets the TPC command in the TPC field in the first DCI format and sets the TPC command in the first DCI format as information of PUCCH power; and Correspondingly the sending module 120 sends the first DCI format.

Preferably the network-side apparatus according to the embodiment of the invention can further include a processing module 130.

The processing module 130 is configured to configure a PUCCH format to a user equipment in order to indicate to the user equipment whether the information in the TPC field can be used to indicate a non-TPC command and to trigger the second determining module 100 after determining that the information in the TPC field can be used to indicate a non-TPC command to determine whether the information in the TPC field in the first DCI format is a non-TPC command.

Preferably the setting module 110 sets whether the information in the TPC field in the first DCI format is a non-TPC command by a DAI in the first DCI format.

Figure 3:
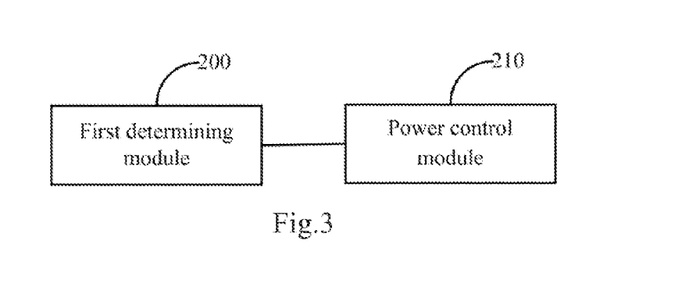
FIG. 3 is a schematic structural diagram of a user equipment according to an embodiment of the invention.

As illustrated in FIG. 3, a user equipment according to an embodiment of the invention includes a first determining module 200 and a power control module 210.

The first determining module 200 is configured to determine whether information in a TPC field in first DCI format is a non-TPC command after receiving the first DCI format.

The power control module 210 is configured to perform PUCCH power control with a TPC command in second DCI format when the information in the TPC field in the first DCI format is a non-TPC command and after receiving the second DCI format together with the first DCI format.

Preferably the power control module 210 performs PUCCH power control with a TPC command in the first DCI format when the information in the TPC field in the first DCI format is the TPC command; and determines an adjustment value of PUCCH power as zero when the information in the TPC field in the first DCI format is a non-TPC command and no second DCI format is received together with the first DCI format.

Preferably the power control module 210 performs PUCCH power control with a TPC command in second DCI format after receiving the second DCI format but no first DCI format.

Preferably the first determining module 200 determines whether the information in the TPC field in the first DCI format is a TPC command after determining from a PUCCH format configured at the network side that the information in the TPC field can be used to indicate a non-TPC command.

Preferably the first determining module 200 determines from a Downlink Assignment Index (DAI) in the first DCI format whether the information in the TPC field in the first DCI format is a TPC command.

Figure 4:
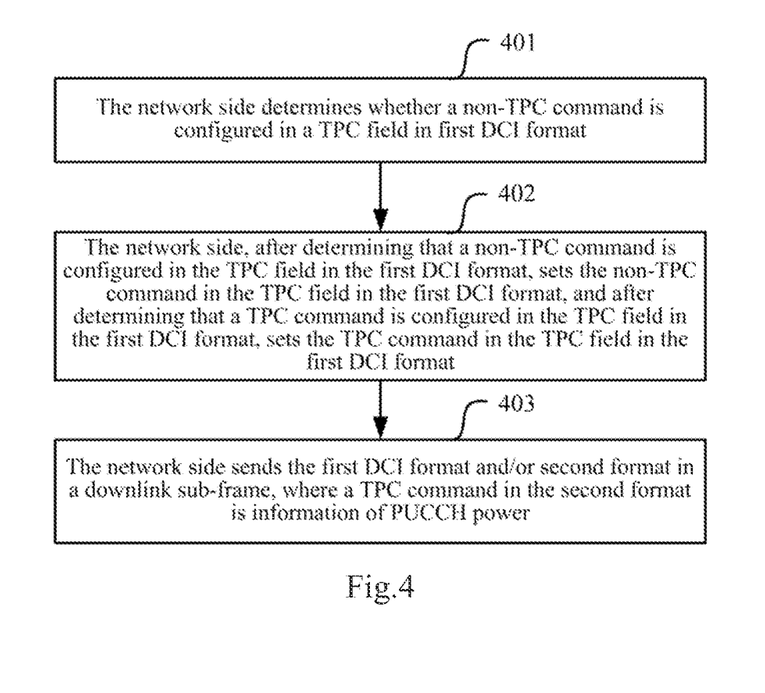
FIG. 4 is a schematic flow chart of a method of sending power control information according to an embodiment of the invention.

As illustrated in FIG. 4, a method of sending power control information according to an embodiment of the invention includes the following steps:

Step 401: The network side determines whether a non-TPC command is configured in a TPC field in first DCI format, Step 402. The network side, after determining that a non-TPC command is configured in the TPC field in the first DCI format, sets the non-TPC command in the TPC field in the first DCI format, and after determining that a TPC command is configured in the TPC field in the first DCI format, sets the TPC command in the TPC field in the first DCI format.

Step 403: The network side sends the first DCI format and/or second DCI format in a downlink sub-frame, where a TPC command in the second DCI format is information of PUCCH power.

In the step 403, when the information in the TPC field in the first DCI format is a non-TPC command, after setting the non-TPC command in the TPC field in the first DCI format, the network side can send only the first DO format with the information in the TPC field which is the non-TPC command; or can send only the second DCI format with the TPC command which is the information of the PUCCH power; or preferably can send in a downlink sub-frame the first DCI format with the information in the TPC field which is the non-TPC command and the second DCI format with the TPC command which is the information of the PUCCH power.

Of course, the network side can further subsequently send the first DCI format with a TPC command which is information of PUCCH power.

Preferably In the step 403, when the information in the TPC field in the first DCI format is a TPC command, after setting the TPC command in the TPC field in the first DCI format, the network side can send only the first DCI format with the information in the TPC field which is the TPC command; or can send only the second DCI format with the TPC command which is the information of the PUCCH power; or can send in a downlink sub-frame the first DCI format with the information in the TPC field which is the TPC command and the second DCI format with the TPC command which is the information of the PUCCH power.

In order to avoid a user equipment from making each determination, preferably a switch can be set, and the user equipment will make determination only if the information in the TPC field in the first DCI format can be used to indicate a non-TPC command.

Specifically before it is determined whether the information in the TPC field in the first DCI format is a non-TPC command, if it is determined that the information in the TPC field can be used to indicate a non-TPC command, then the network-side can notify the user equipment that the information in the TPC field can be used to indicate a non-TPC command before sending the first DCI format.

The network-side can notify the user equipment that the information in the TPC field can or cannot be used to indicate a non-TPC command in numerous schemes, for example, by sending bit information, where "1" indicates "CAN", and "0" indicates "CAN NOT".

Preferably the network-side can configure a PUCCH format to the user equipment in order to indicate the user equipment whether the information in the TPC field can be used to indicate a non-TPC command.

For example, the PUCCH format 3 and the PUCCH format 1b which is combined with channel selection correspond to that the information in the TPC field can be used to indicate a non-TPC command, and the PUCCH format 1/1a/1b corresponds to that the information in the TPC field can not be used to indicate a non-TPC command. The network-side configures the user equipment with the PUCCH format 3 or the PUCCH format 1b which is combined with channel selection, and then the information in the TPC field in the first DCI format can be used to indicate a non-TPC command; and the network configures the user equipment with the PUCCH format 1/1a/1b, and then the information in the TPC field in the first DCI format can not be used to indicate a non-TPC command.

In the step 402, the network-side can notify the user equipment whether the information in the TPC field in the first DCI format is a non-TPC command in numerous schemes, for example, the network-side sends a notification message to the user equipment to notify the user equipment whether the information in the TPC field in the first DCI format is a non-TPC command.

Preferably the network side sets whether the information in the TPC field in the first DCI format is a non-TPC command by a DAI in the first DCI format.

For example, a TPC field with a corresponding DAI of "1" is a TPC command, and a TPC field with a corresponding DAI of "2", "3" or "4" is a non-TPC command, and then the network-side sets the TPC command in the TPC field in the first DCI format with the DAI of "1" and the non-TPC command in the TPC field in the first DCI format with the DAI of other than "1".

Figure 5:
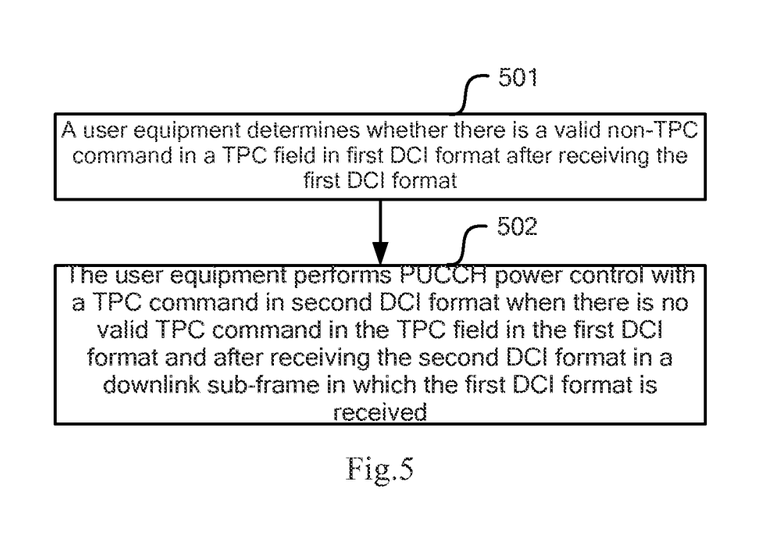
FIG. 5 is a schematic flow chart of a power control method according to an embodiment of the invention.

As illustrated in FIG. 5, a power control method according to an embodiment of the invention includes the following steps:

Step 501: A user equipment determines whether information in a TPC field in first DCI format is a non-TPC command after receiving the first DCI format.

Step 502: The user equipment performs PUCCH power control with a TPC command in second DCI format when the information in the TPC field in the first DCI format is a non-TPC command and after receiving the second DCI format in a downlink sub-frame in which the first DCI format is received.

If the first DCI format is received, then the user equipment determines whether the information in the Transmit Power Control (TPC) field in the first DCI format is a non-TPC command after receiving the first DCI format and performs PUCCH power control with the TPC command in second DCI format when the information in the TPC field in the first DCI format is a non-TPC command and after receiving the second DCI format in the downlink sub-frame in which the first DCI format is received.

After it is determined whether the information in the Transmit Power Control (TPC) field in the first DCI format is a non-TPC command, if the information in the TPC field in the first DCI format is determined to be a TPC command, then the user equipment performs PUCCH power control with the TPC command in the first DCI format regardless of whether the second DCI format is received.

After it is determined whether the information in the Transmit Power Control (TPC) field in the first DCI format is a non-TPC command, if the information in the TPC field in the first DCI format is determined to be a non-TPC command and when no second DCI format is received in the downlink sub-frame in which the first DCI format is received, an adjustment value of PUCCH power is determined to be zero, and at this time the user equipment can perform no PUCCH power control or can adjust according to zero.

If the user equipment receives the second DCI format but no first DCI format in a downlink sub-frame in which the second DCI format is received, then it performs PUCCH power control with the TPC command in the second DCI format.

In order to avoid the user equipment from making each determination, preferably a switch can be set, and the user equipment will make determination only if the information in the TPC field can be used to indicate a non-TPC command.

Specifically the user equipment will determine whether the information in the TPC field in the first DCI format is a non-TPC command only after determining from a notification from the network side that the information in the TPC field can be used to indicate a non-TPC command.

Preferably if the network-side configures a PUCCH format to the user equipment in order to indicate the user equipment that the information in the TPC field can be used to indicate a non-TPC command, then the user equipment determines from the PUCCH format configured by the network-side that the information in the TPC field can be used to indicate a non-TPC command.

In an implementation, the user equipment can determine from a received notification message from the network side whether the information in the TPC field in the first DCI format is a non-TPC command Preferably if the network-side sets whether the information in the TPC field in the first DCI format is a non-TPC command by a DAI in the first DCI format, then the user equipment determines from the DAI in the first DCI format whether the information in the TPC field in the first DCI format is a non-TPC command in the step 501.

Particularly FIG. 4 and FIG. 5 can be integrated into a flow forming a new power control method in which firstly the step 401 to the step 403 and then the step 501 to the step 502 are performed.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

The user equipment can determine power control information provided from the network side and perform PUCCH power control when the information in the TPC field is used to indicate a non-TPC command to thereby improve the accuracy of PUCCH power and the performance of the user equipment.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A power control method, wherein the method comprises:
a user equipment determining whether information in a Transmit Power Control, TPC, field in first Downlink Control Information, DCI, format is a non-TPC command after receiving the first DCI format; and
the user equipment performing Physical Uplink Control Channel, PUCCH, power control with a TPC command in second DCI format when the information in the TPC field in the first DCI format is the non-TPC command and the user equipment receives the second DCI format in a downlink sub-frame in which the first DCI format is received,
wherein after the user equipment determines whether the information in the TPC field in first DCI format is the non-TPC command, the method further comprises:
when the information in the TPC field in the first DCI format is a TPC command, the user equipment performing Physical Uplink Control Channel, PUCCH, power control with the TPC command in the first DCI format; and
when the information in the TPC field in the first DCI format is the non-TPC command and the user equipment does not receive the second DCI format in the downlink sub-frame in which the first DCI format is received, the user equipment determining an adjustment value of PUCCH power as zero.

2. The method according to claim 1, further comprising:
when no first DCI format is received in a downlink sub-frame in which the second DCI format is received, the user equipment performing PUCCH power control with the TPC command in the second DCI format.

3. The method according to claim 1, wherein the first DCI format is any one of:
a DCI format 1A, a DCI format 1B, a DCI format 1D, a DCI format 1, a DCI format 2A, a DCI format 2B, a DCI format 2C and a DCI format 2; and
the second DCI format is any one of:
a DCI format 3A and a DCI format 3.

4. The method according to claim 1, wherein before the user equipment determines whether the information in the TPC field in the first DCI format is the non-TPC command, the method further comprises:
the user equipment determining the information in the TPC field in the first DCI format is configured to indicate the non-TPC command by a PUCCH format configured by a network side.

5. The method according to claim 1, wherein the user equipment determining whether the information in the TPC field in the first DCI format is the non-TPC command comprises:
the user equipment determining whether the information in the TPC field in the first DCI format is the non-TPC command by a Downlink Assignment Index, DAI, in the first DCI format.

6. A method of sending power control information, comprising:
a network side determining whether a non-Transmit Power Control, TPC, command is configured in a TPC field in first Downlink Control Information, DCI, format;
when the non-TPC command is configured in the TPC field in the first DCI format, the network side setting the non-TPC command in the TPC field in the first DCI format; and
the network side sending the first DCI format or second format in a downlink sub-frame,
wherein a TPC command in the second format is information of Physical Uplink Control Channel, PUCCH, power,
wherein the network side sending the first DCI format or second format in the downlink sub-frame comprises:
the network side sending in the downlink sub-frame both the first DCI format and the second DCI format to a user equipment to enable the user equipment to perform PUCCH power control with the TPC command in the second DCI format, or the network side sending in the downlink sub-frame only the first DCI format rather than the second DCI format to the user equipment to enable the user equipment to determine an adjustment value of PUCCH power as zero,
wherein the method further comprises: when the TPC command is configured in the TPC field in the first DCI format, the network side setting the TPC command in the TPC field in the first DCI format and sending at least the first DCI format to the user equipment to enable the user equipment to perform PUCCH power control with the TPC command in the first DCI format.

7. The method according to claim 6, wherein the first DCI format is any one of:

a DCI format 1A, a DCI format 1B, a DCI format 1D, a DCI format 1, a DCI format 2A, a DCI format 2B, a DCI format 2C and a DCI format 2; and the second DCI format is any one of:

a DCI format 3A and a DCI format 3.

8. The method according to claim 6, wherein before the network side determines whether the non-TPC command is configured in the TPC field in the first DCI format, the method further comprises:

the network side determining that the information in the TPC field in the first DCI format is configured to indicate the non-TPC command; and before the network side sends the first DCI format, the method further comprises:

the network side configuring a PUCCH format to a user equipment, in order to indicate to the user equipment that the information in the TPC field in the first DCI format is configured to indicate the non-TPC command.

9. The method according to claim 6, wherein the network side determining whether the non-TPC command is configured in the TPC field in the first DCI format comprises:

the network side determining whether the non-TPC command is configured in the TPC field in the first DCI format by a DAI in the first DCI format.

10. A power control apparatus, comprising:

a first determining module configured to determine whether information in a Transmit Power Control, TPC, field in first Downlink Control Information, DCI, format is a non-TPC command after receiving the first DCI format; and a power control module configured to perform Physical Uplink Control Channel, PUCCH, power control with a TPC command in second DCI format when the information in the TPC field in the first DCI format is the non-TPC command and the user equipment receives the second DCI format in a downlink sub-frame in which the first DCI format is received, wherein the power control module is further configured:

when the information in the TPC field in the first DCI format is a TPC command, to perform Physical Uplink Control Channel, PUCCH, power control with the TPC command in the first DCI format; and when the information in the TPC field in the first DCI format is the non-TPC command and no second DCI format is received in the downlink sub-frame in which the first DCI format is received, to determine an adjustment value of PUCCH power as zero.

11. The apparatus according to claim 10, wherein the power control module is further configured:

when no first DCI format is received in a downlink sub-frame in which the second DCI format is received, to perform PUCCH power control with the TPC command in the second DCI format.

12. The apparatus according to claim 10, wherein the first DCI format is any one of:

a DCI format 1A, a DCI format 1B, a DCI format 1D, a DCI format 1, a DCI format 2A, a DCI format 2B, a DCI format 2C and a DCI format 2; and the second DCI format is any one of:

a DCI format 3A and a DCI format 3.

13. The apparatus according to claim 10, wherein the first determining module is configured:

to determine whether the information in the TPC field in the first DCI format is the non-TPC command after determining that the information in the TPC field in the first DCI format is configured to indicate the non-TPC command by a PUCCH format configured by a network side.

14. The apparatus according to claim 10, wherein the first determining module is configured:

to determine whether the information in the TPC field in the first DCI format is the non-TPC command by a Downlink Assignment Index, DAI, in the first DCI format.

* * * * *